United States Patent
Kubota

(10) Patent No.: US 8,730,352 B2
(45) Date of Patent: May 20, 2014

(54) IMAGE PROCESSING APPARATUS AND IMAGE PROCESSING METHOD

(75) Inventor: Akira Kubota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 486 days.

(21) Appl. No.: 12/965,647

(22) Filed: Dec. 10, 2010

(65) Prior Publication Data

US 2011/0141316 A1  Jun. 16, 2011

(30) Foreign Application Priority Data

Dec. 16, 2009 (JP) ................................ 2009-285649

(51) Int. Cl.
*H04N 9/68* (2006.01)

(52) U.S. Cl.
USPC ........................................................ 348/234

(58) Field of Classification Search
USPC ........................................................ 348/234
See application file for complete search history.

(56) References Cited

U.S. PATENT DOCUMENTS 8,106,958 B2 * 1/2012 Takahashi .................. 348/222.1

FOREIGN PATENT DOCUMENTS

| JP | 2001-222048 A | 8/2001 |
|---|---|---|
| JP | 2007-228201 A | 9/2007 |
| JP | 2009-063674 A | 3/2009 |
| JP | 2009-124309 A | 6/2009 |

* cited by examiner

*Primary Examiner* — James Hannett
(74) *Attorney, Agent, or Firm* — Canon USA Inc. IP Division

(57) ABSTRACT

An image processing apparatus and an image processing method that enable suitable contrast adjustment are provided. The image processing apparatus includes a region detection unit configured to detect predetermined first luminance level detection region and second luminance level detection region in a human face as a target to be photographed, a luminance amount calculation unit configured to calculate an absolute value of a difference between a luminance level of the first luminance level detection region and a certain reference luminance level as a high luminance amount and calculate an absolute value of a difference between a luminance level of the second luminance level detection region and the reference luminance level as a low luminance amount, and a determination unit configured to determine whether a difference or a ratio between the high luminance amount and the low luminance amount falls within a certain range.

12 Claims, 15 Drawing Sheets

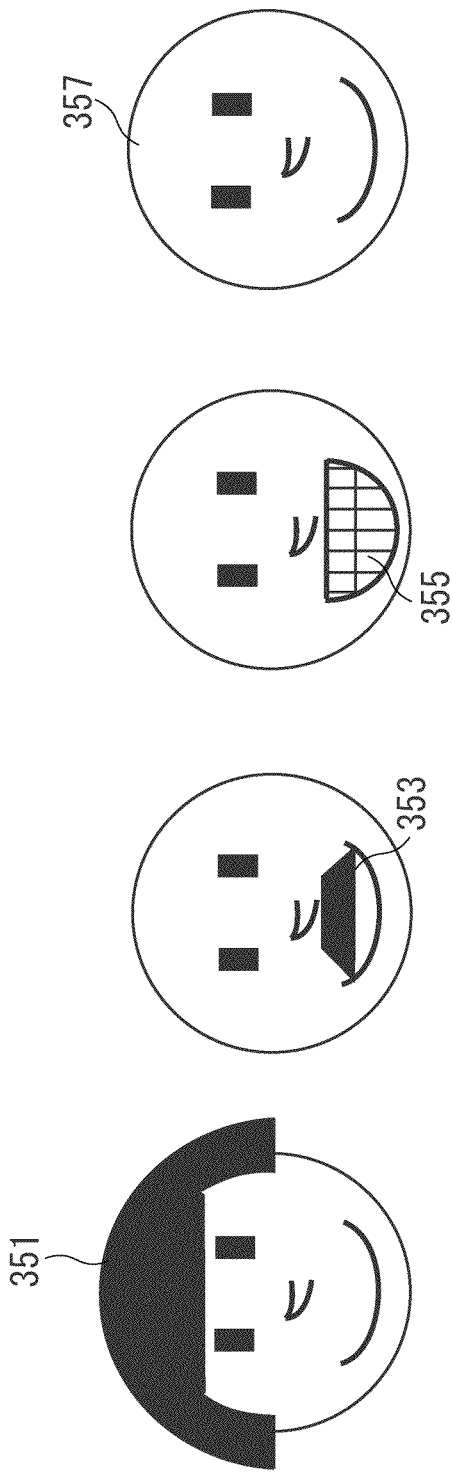

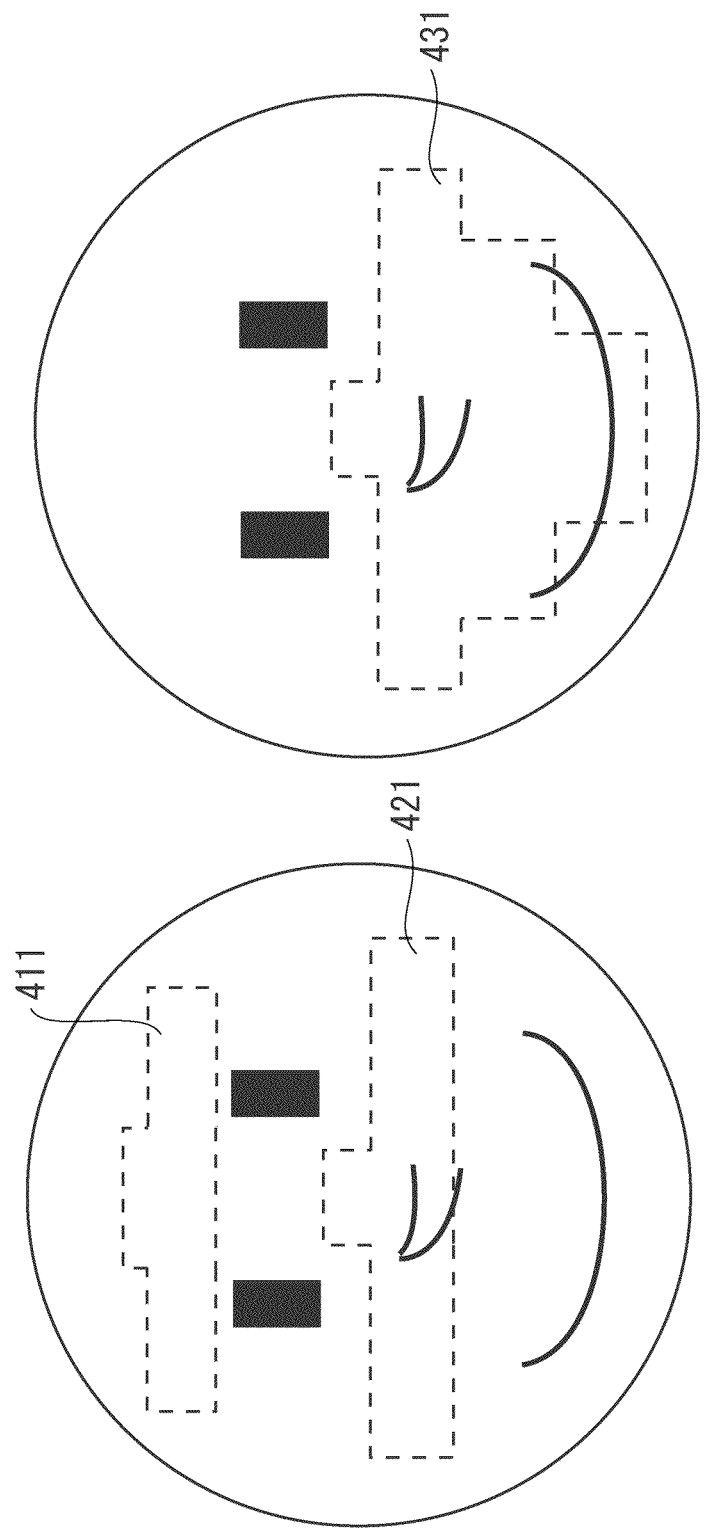

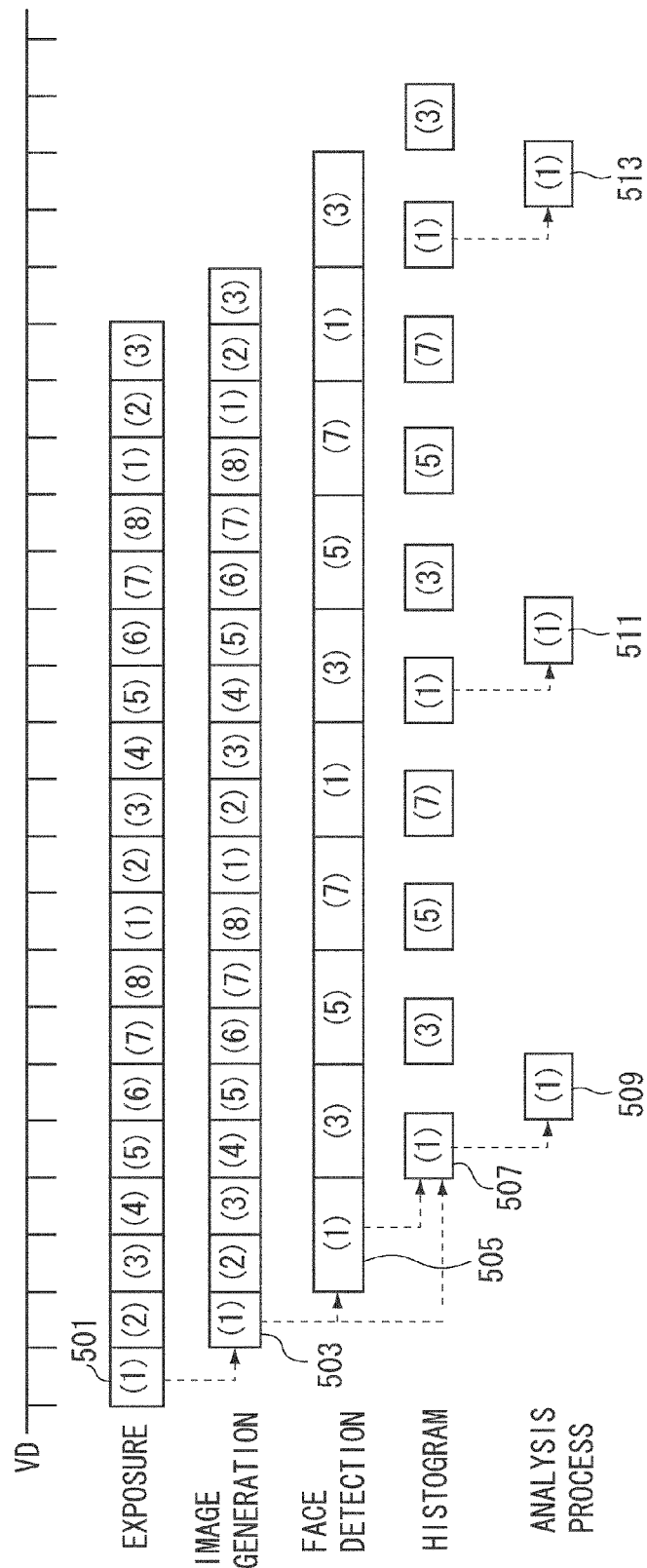

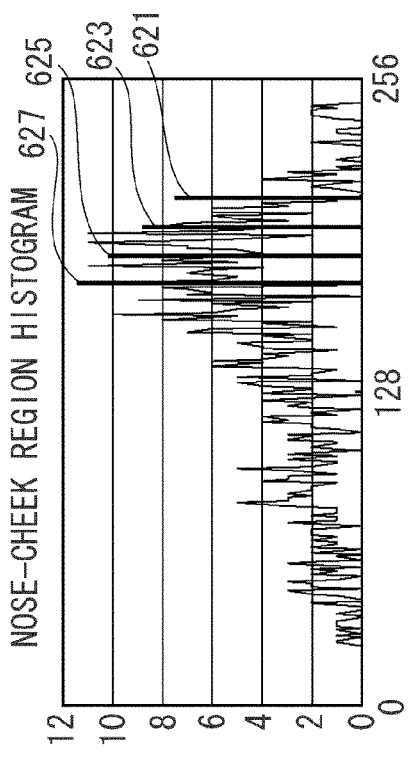
FIG. 11A FOREHEAD REGION HISTOGRAM
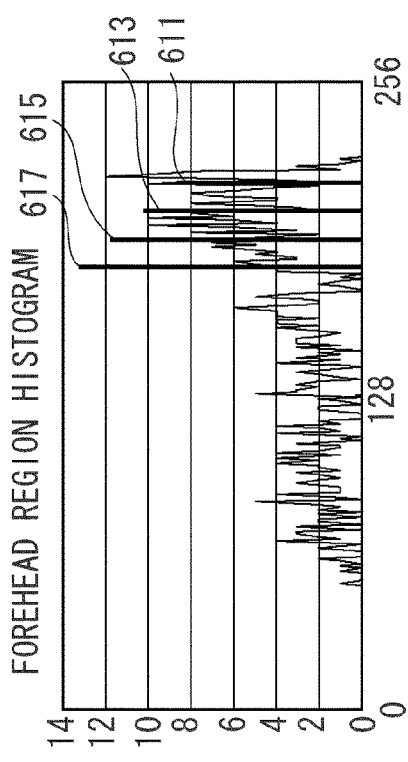
FIG. 11B NOSE-CHEEK REGION HISTOGRAM
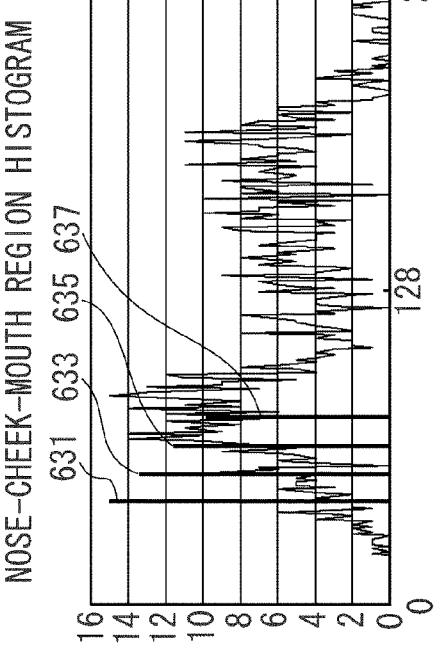
FIG. 11C NOSE-CHEEK-MOUTH REGION HISTOGRAM
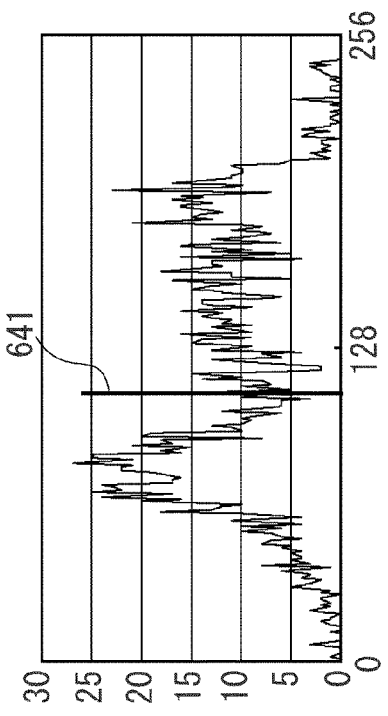
FIG. 11D ENTIRE FACE REGION HISTOGRAM

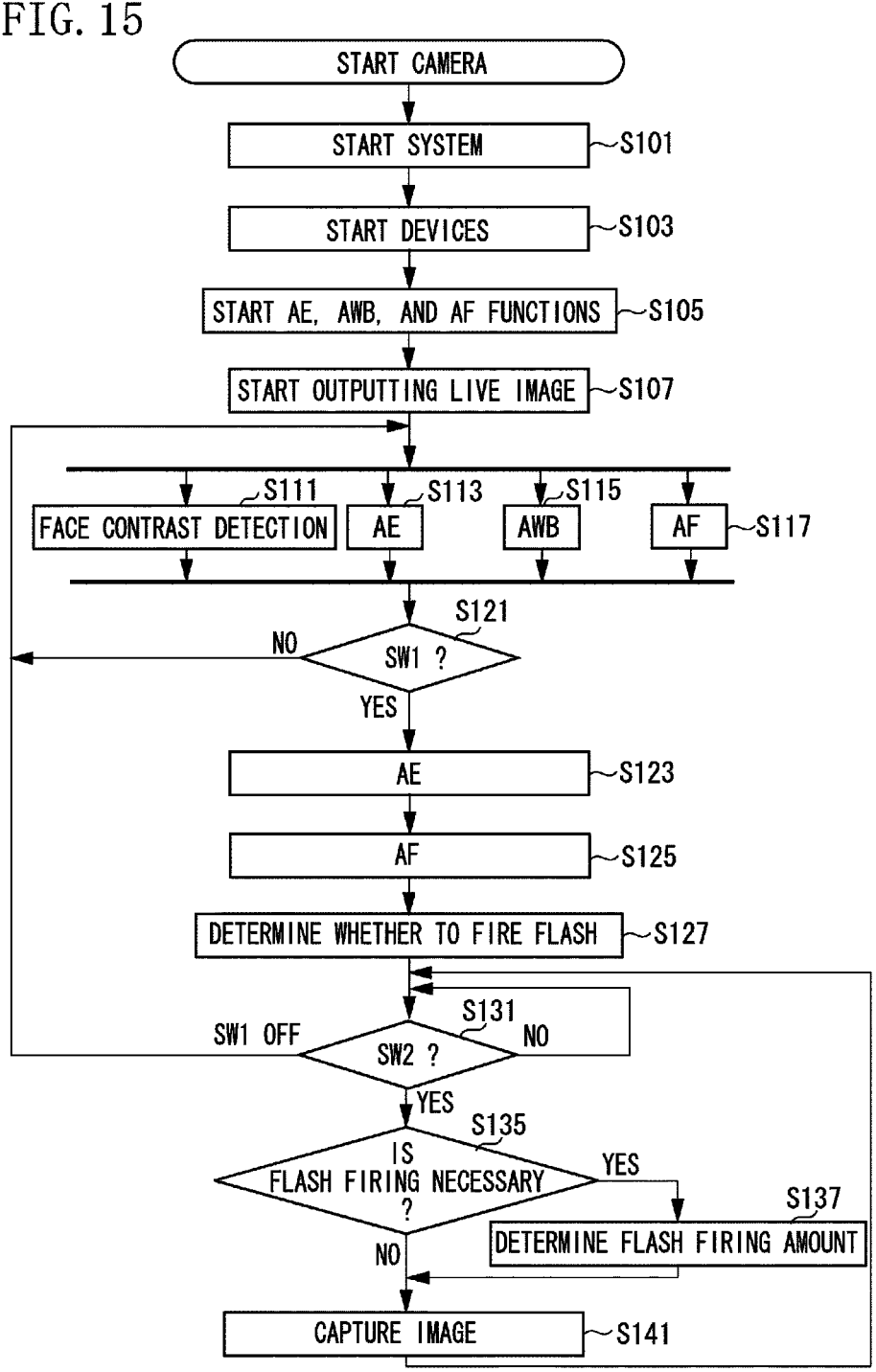

IMAGE PROCESSING APPARATUS AND IMAGE PROCESSING METHOD

BACKGROUND OF THE INVENTION

1. Field of the Invention

The present invention relates to an image processing apparatus, an image processing method, and the like which are suitable for use in capturing an image of a human face.

2. Description of the Related Art

An imaging apparatus with an automatic exposure (AE) control function is widely used. When an object is photographed, an imaging apparatus with such AE control function can automatically set an appropriate aperture, shutter speed, and sensitivity based on brightness of the object. In the automatic exposure control, the imaging apparatus can use not only luminance information obtained by uniformly measuring luminance of the entire image frame but also regional light and dark contrast information obtained by dividing the image frame into a plurality of regions and measuring brightness of each of the regions. For example, when a photographer takes a photograph of a person standing with his or her back to the sun, that is, in a backlight scene, the imaging apparatus may produce an image in which the person is underexposed. In such a case, based on brightness information about each of the regions in the entire image frame, the imaging apparatus can determine whether photographing involves such a backlight scene and set an appropriate exposure level to brighten the person as a main object.

However, if the imaging apparatus adjusts exposure settings that are based on the aperture, shutter speed, and sensitivity to increase luminance of the person to an appropriate level, the background may be overexposed. To prevent this, the imaging apparatus obtains an appropriate background luminance level by adjusting the exposure settings that are based on the aperture, shutter speed, and sensitivity, and increases luminance of the underexposed person to an appropriate level by automatically firing a flash. Thus, the imaging apparatus can capture both the background and the main object with appropriate luminance. It is known that such use of flash firing is effective in capturing a scene with a significant contrast. Further, when the shutter speed is decreased in a low illumination scene, camera shake or object movement may be caused. As an effective measure against this, it is known that the imaging apparatus automatically fires a flash depending on the shutter speed.

Another situation in which automatic flash firing is desirable is when a human face partly includes dark shadows. For example, when the imaging apparatus photographs a person outdoors during the day, the sunlight illuminates the forehead or the nose bridge of the face from directly above or obliquely, which may result in formation of shadows around the eyes, lower cheeks, mouth, and the like. Also, when the imaging apparatus photographs a person indoors under a light source having some directional property in light distribution, such as a downlight or a spotlight, the face of the person may include shadows.

In automatic exposure control, even if the imaging apparatus adjusts the exposure settings that are based on the aperture, shutter, and sensitivity to set an appropriate brightness level for a human face, if a scene involves such a significant contrast, it is difficult for the imaging apparatus to generate a suitable image. Further, if the imaging apparatus averages brightness of the human face and calculates a luminance to automatically determine whether to fire a flash, bright regions and dark regions are canceled out. In this case, since the imaging apparatus recognizes that the face already has an appropriate brightness level, the imaging apparatus may not automatically fire a flash.

In view of the above points, Japanese Patent Application Laid-Open No. 2009-63674 discusses a technique, when the imaging apparatus detects a human face including a low luminance region, the imaging apparatus recognizes this region as a shadow and automatically fires a flash.

However, while this conventional technique discussed in Japanese Patent Application Laid-Open No. 2009-63674 achieves its intended object, the imaging apparatus is not sufficiently accurate in determining whether the low luminance region recognized as a shadow is actually a shadow formed by external light. Thus, the imaging apparatus often executes unnecessary flash firing. For example, the imaging apparatus may erroneously determine accessories such as sunglasses, glasses, or caps, mustache, hair, or dark skin of a person to be a shadow. As a result, the imaging apparatus may fail to execute suitable contrast adjustment.

This is a problem not only for imaging apparatuses that fire a flash. Image processing apparatuses have a similar problem. For example, when an image processing apparatus acquires an image and determines that an object in the image includes a shadow region, the image processing apparatus increases the luminance level of the shadow region in the image to set the contrast of the object in the image to an appropriate level. If the image processing apparatus erroneously determines accessories such as sunglasses, glasses, or caps, mustache, or hair to be a shadow, the image processing apparatus cannot appropriately adjust contrast of the object.

SUMMARY OF THE INVENTION

The present invention is directed to an image processing apparatus, an image processing method, and the like that can suitably adjust a contrast.

According to an aspect of the present invention, an image processing apparatus includes a region detection unit configured to detect predetermined first luminance level detection region and second luminance level detection region in a human face as a target to be photographed, a luminance amount calculation unit configured to calculate an absolute value of a difference between a luminance level of the first luminance level detection region and a certain reference luminance level as a high luminance amount and calculate an absolute value of a difference between a luminance level of the second luminance level detection region and the reference luminance level as a low luminance amount, and a determination unit configured to determine whether a difference or a ratio between the high luminance amount and the low luminance amount falls within a certain range.

According to another aspect of the present invention, a method for processing an image includes detecting predetermined first luminance level detection region and second luminance level detection region in a human face as a target to be photographed, calculating an absolute value of a difference between a luminance level of the first luminance level detection region and a certain reference luminance level as a high luminance amount and calculating an absolute value of a difference between a luminance level of the second luminance level detection region and the reference luminance level as a low luminance amount, and determining whether a difference or a ratio between the high luminance amount and the low luminance amount falls within a certain range.

According to yet another aspect of the present invention, a computer-readable nonvolatile storage medium stores a program causing a computer to execute image processing. The program includes detecting predetermined first luminance level detection region and second luminance level detection region in a human face as a target to be photographed, calculating an absolute value of a difference between a luminance level of the first luminance level detection region and a certain reference luminance level as a high luminance amount and calculating an absolute value of a difference between a luminance level of the second luminance level detection region and the reference luminance level as a low luminance amount, and determining whether a difference or a ratio between the high luminance amount and the low luminance amount falls within a certain range.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3A illustrates a human face with forelocks falling over and covering a forehead region. FIG. 3B illustrates a human face with a mustache. FIG. 3C illustrates a human face smiling with white teeth. FIG. 3D illustrates a human face with dark skin.

FIG. 7A illustrates a forehead region and a nose-cheek region, and FIG. 7B illustrates a nose-cheek-mouth region.

FIG. 10 illustrates timing control according to the exemplary embodiment of the present invention.

FIGS. 11A to 11D are a forehead region histogram, a nose-cheek region histogram, a nose-cheek-mouth region histogram, and an entire face region histogram, respectively.

FIG. 15 is a flow chart illustrating an operation of a camera.

DESCRIPTION OF THE EMBODIMENTS

Various exemplary embodiments, features, and aspects of the invention will be described in detail below with reference to the drawings.

Figure 1:
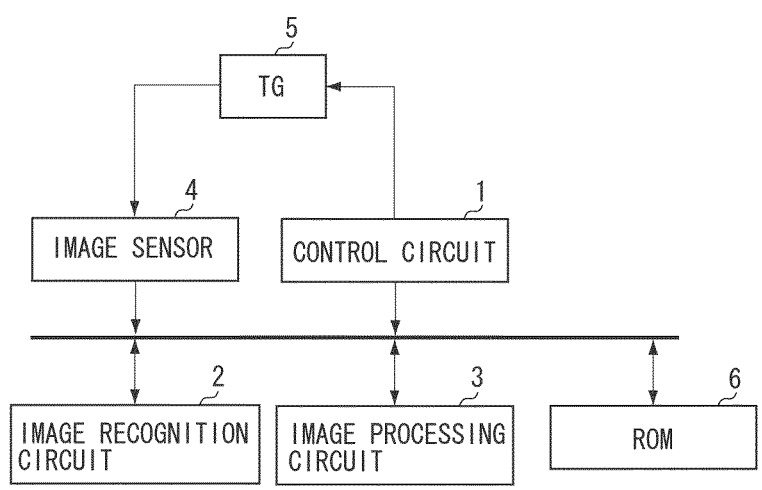
FIG. 1 is a block diagram illustrating a configuration of an image processing apparatus according to an exemplary embodiment of the present invention.

FIG. 1 is a block diagram illustrating a configuration of an image processing apparatus (camera) according to an exemplary embodiment of the present invention.

A camera 100 according to the exemplary embodiment includes a control circuit 1, an image recognition circuit 2, an image processing circuit 3, an image sensor 4, and a timing generator (TG) 5. The image recognition circuit 2 recognizes a certain portion (e.g., a human face) in an image captured by the image sensor 4. The image recognition circuit 2 includes a face detection block. The image processing circuit 3 executes various types of image processing on the image captured by the image sensor 4. The TG 5 outputs a driving signal such as a vertical synchronizing signal VD to the image sensor 4.

The control circuit 1 controls the image recognition circuit 2, the image processing circuit 3, and the TG 5. Additionally, the control circuit 1 controls a shutter, an aperture, a flash, and the like (not illustrated). The camera 100 may include a built-in flash. Alternatively, an external device for flash may be attached to the camera 100. A read-only memory (ROM) 6 is a nonvolatile storage medium, and the control circuit 1, the image recognition circuit 2, and the image processing circuit 3 read programs stored in the ROM 6 and execute processing based on the read programs.

Next, the image recognition circuit 2 and the image processing circuit 3 will be described.

Figure 2A:
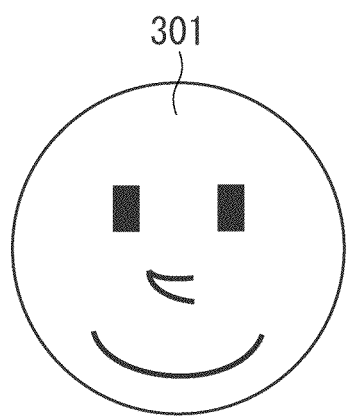
FIG. 2A illustrates a human face exhibiting no contrast, each part of the human face being evenly illuminated by external light.
Figure 2B:
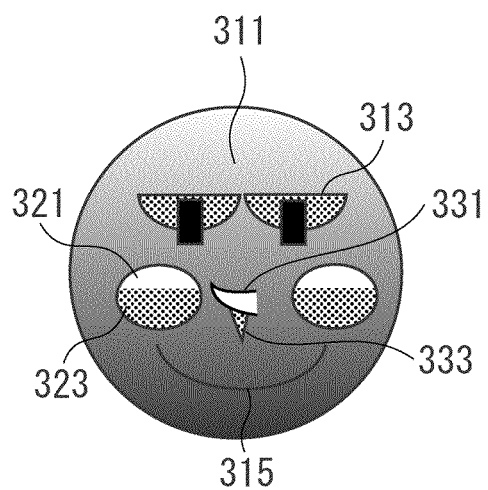
FIG. 2B illustrates a human face exhibiting a high contrast, each part of the human face being unevenly illuminated by external light.

FIGS. 2A and 2B illustrate two human faces illuminated by external light differently from each other. More specifically, FIG. 2A illustrates a human face exhibiting no contrast, each part of the human face being evenly illuminated by external light. In this situation, the camera 100 can averagely measure an entire luminance of a human face 301, determine the aperture, shutter speed, and sensitivity based on results of a light-metering operation, and capture a suitable image without flash firing.

On the other hand, FIG. 2B illustrates a human face exhibiting a high contrast, each part of the human face being unevenly illuminated by external light. Such a situation arises, for example, when the camera captures a person standing outdoors under the sunlight during the day or indoors directly under an illumination light. In such a situation, while external light strongly illuminates a forehead region 311 of the person, since the external light does not sufficiently illuminate depressed regions 313 around the eyes and a mouth-chin region 315, shadows are formed in these regions 313 and 315. In addition, while the external light strongly illuminates cheek regions 321 and a nose bridge region 331, shadows are easily formed in lower cheek regions 323 and a region 333 under the nose.

Since a human face with such high contrast does not make a good impression as a portrait, it is desirable to reduce such high contrast. One way of obtaining an image with a reduced contrast is to allow a flash unit included in the camera to emit light to illuminate shadow regions. In this way, the camera can capture an image with reduced shadows. Another way is to allow the image processing circuit 3 to execute image processing to increase the luminance levels of shadow regions in the human face. When a human face includes shadows, raised portions such as the forehead, cheeks, and the nose bridge tend to have a high luminance level. Thus, to obtain an image with a reduced contrast, the image processing circuit 3 may execute image processing to decrease luminance levels of these high luminance regions.

As described above, it is desirable that the camera capture an image so that a human face of the image has a reduced contrast. To this end, it is important that the camera can accurately detect the contrast of the human face which is naturally formed by external light. When external light illuminates a human face, bright and dark regions are formed depending on facial irregularity of raised and recessed portions. Examples of the raised portion include the forehead, the cheeks, and the nose, and examples of the recessed portion include eye regions, the lower cheek regions, a region under the nose, and a mouth region. By measuring high luminance levels of the raised portions and low luminance levels of the recessed regions, the camera can detect the contrast of the human face. However, as will be described below, facial characteristics and/or accessories on the face or the head may hinder accurate detection of the luminance levels.

FIGS. 3A to 3D illustrate facial characteristics as factors that hinder detection of the contrast of the human face. As illustrated in FIG. 3A, an image may include a person with forelocks 351 falling over and covering the forehead region. In this case, it is difficult to extract a high luminance level from the forehead region. As illustrated in FIG. 3B, an image may include a person with a mustache 353. In this case, the camera easily determines the mustache 353 as a shadow by mistake. As illustrated in FIG. 3C, an image may include a person smiling with white teeth 355. In this case, since the white teeth 355 tend to have a high luminance, the camera often erroneously determines the mouth region as a high luminance level detection region. As illustrated in FIG. 3D, an image may include a person with dark skin 357. In this case, irrespective of the recessed portions of the face, the brightness of the entire face is low, and thus, the camera may erroneously detect shadows easily.

Figure 4A:
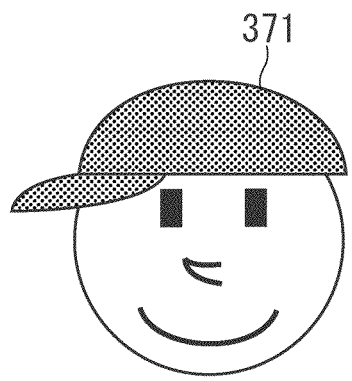
FIG. 4A illustrates a human face with a cap.
Figure 4B:
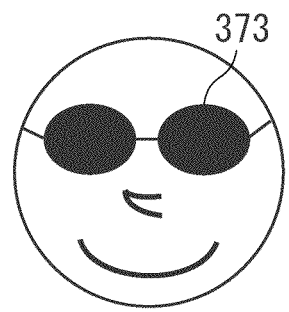
FIG. 4B illustrates a human face with sunglasses.

FIGS. 4A and 4B illustrate human faces with accessories as factors that hinder detection of the contrast of the human faces. As illustrated in FIG. 4A, an image may include a person wearing a cap 371. In this case, it is difficult to extract a high luminance level from the forehead region. As illustrated in FIG. 4B, an image may include a person wearing sunglasses 373. In this case, the camera easily determines the dark sunglasses to be a shadow erroneously. If the image includes a person wearing sunglasses with a high reflectance or sunglasses or glasses with a whitish frame, the camera may erroneously determine that the external light strongly illuminates the face and the eye region has a high luminance.

Thus, facial characteristics and/or accessories on the face or the head may hinder accurate detection of the luminance levels. According to the present exemplary embodiment, a face detection block of the image recognition circuit 2 creates face information to execute face detection. By using results of the face detection, the image processing circuit 3 acquires luminance distributions.

Figure 5:
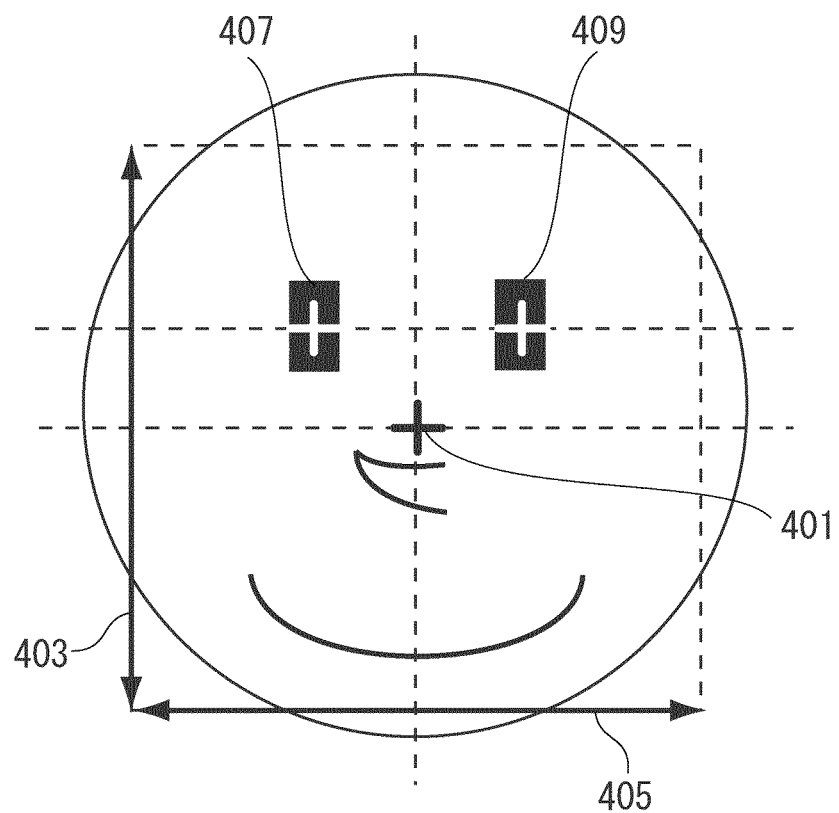
FIG. 5 illustrates face information.
Figure 6:
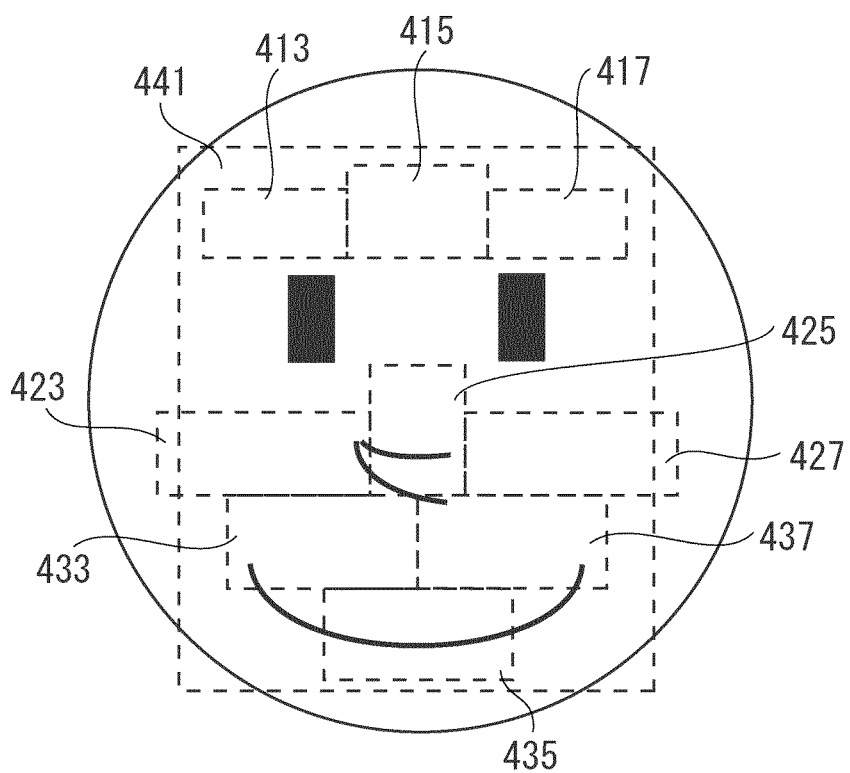
FIG. 6 illustrates histogram acquisition regions.

As illustrated in FIG. 5, the face information includes information representing coordinates 401 of the center of the face, information representing a face size 403 and 405, and information representing coordinates 407 and 409 of the right and left eyes, respectively. Further, as illustrated in FIG. 6, for face detection, the face detection block sets 10 histogram acquisition regions in the human face. These 10 histogram acquisition regions include three histogram acquisition regions 413, 415, and 417 belonging to the forehead region and three histogram acquisition regions 423, 425, and 427 belonging to the nose-cheek region. In addition, these 10 histogram acquisition regions include three histogram acquisition regions 433, 435, and 437 belonging to the mouth region and a histogram acquisition region 441 corresponding to the entire face.

The forehead region is located away from positions of the eyes of the person by a certain distance in the direction to the top of the head. The nose-cheek region is located away from the positions of the eyes by a certain distance to the chin direction. The mouth region is located away from the positions of the eyes by a certain distance to the chin direction. The certain distance may be set by using a certain ratio between the face sizes 403 and 405. In this way, the certain distance coordinates with the face size of a person. By setting the forehead region, the nose-cheek region, and the mouth region in this way, even if only the positions of the eyes are known, other regions of the face can be identified.

If the face information includes pieces of information that can identify the nose, mouth, cheeks, and the like, the information may be used. In either case, when the histogram acquisition regions are set, the six histogram acquisition regions, that is, the histogram acquisition regions 423, 425, and 427 in the nose-cheek region and the histogram acquisition regions 433, 435, and 437 in the mouth region, are set so as not to overlap with each other.

To acquire luminance distributions, the image processing circuit 3 combines a plurality of regions among the above ten histogram acquisition regions and acquires a luminance histogram. For example, as illustrated in FIG. 7A, as a region detection unit, the image processing circuit 3 combines the three histogram acquisition regions 413, 415, and 417 in the forehead region to form a forehead region 411 (a first luminance level detection region) and acquires histogram information relating to the forehead region 411. Similarly, as a region detection unit, the image processing circuit 3 combines the three histogram acquisition regions 423, 425, and 427 in the nose-cheek region to form a nose-cheek region 421 (the first luminance level detection region) and acquires histogram information relating to the nose-cheek region 421.

Similarly, as illustrated in FIG. 7B, as a region detection unit, the image processing circuit 3 combines the three histogram acquisition regions 423, 425, and 427 in the nose-cheek region and the three histogram acquisition regions 433, 435, and 437 in the mouth region to form a nose-cheek-mouth region 431 (a second luminance level detection region). The image processing circuit 3 acquires histogram information relating to the nose-cheek-mouth region 431.

In this way, the face detection block is used to acquire histogram information by combining a plurality of luminance distribution information. The face detection block is set by dividing a human face into small histogram acquisition regions in advance, and the image processing circuit 3 acquires a luminance distribution by combining a plurality of the regions. Thus, even when the face has a complex shape, the image processing circuit 3 can acquire luminance distribution information about the face. Histograms of the forehead region 411 and the nose-cheek region 421 are used to detect high luminance regions in the face, and a histogram of the nose-cheek-mouth region 431 is used to detect a low luminance region in the face, which will be described in detail below.

It is preferable that a region located within a certain area from the positions of the eyes and the mouth region are excluded from regions (the first luminance level detection regions) from which histograms used to detect the high luminance regions are acquired. In addition, it is preferable that a region located within a certain area from the positions of the eyes and the forehead region are excluded from a region (the second luminance level detection region) from which a histogram used to detect the low luminance region is acquired.

Figure 8B:
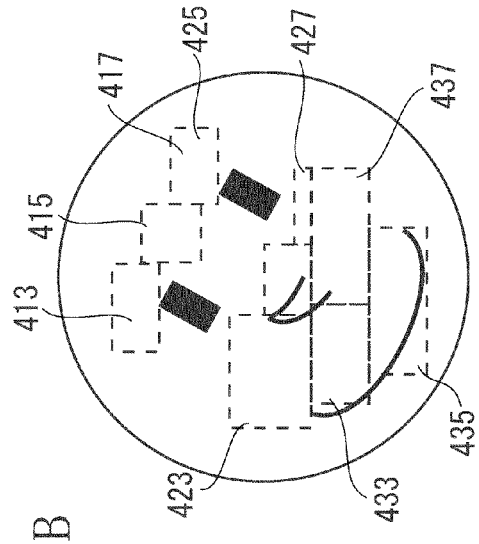
FIG. 8B illustrates a human face at a tilt.
Figure 8D:
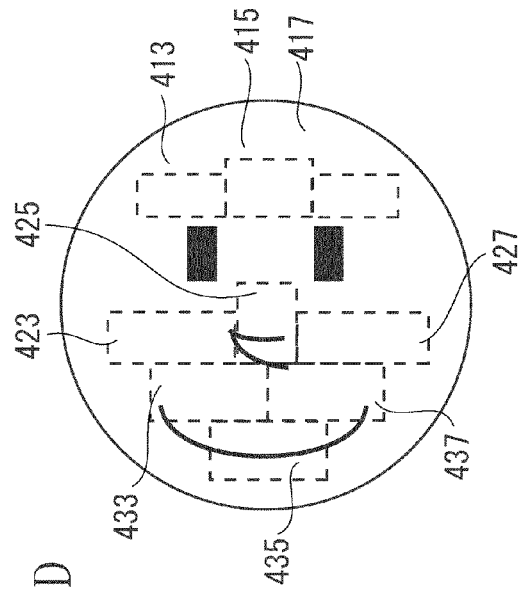
FIG. 8D illustrates a human face at a 90-degree tilt.

Since a human face is divided into the small histogram acquisition regions as described above, the image processing circuit 3 can process a human face with a complex shape. Even when an image includes a human face tilted horizontally or diagonally as illustrated in FIGS. 8B to 8D, such division is still effective. For example, such tilt is caused when a person as an object tilts the head or when a photographer changes his/her holding position of the camera.

Figure 8A:
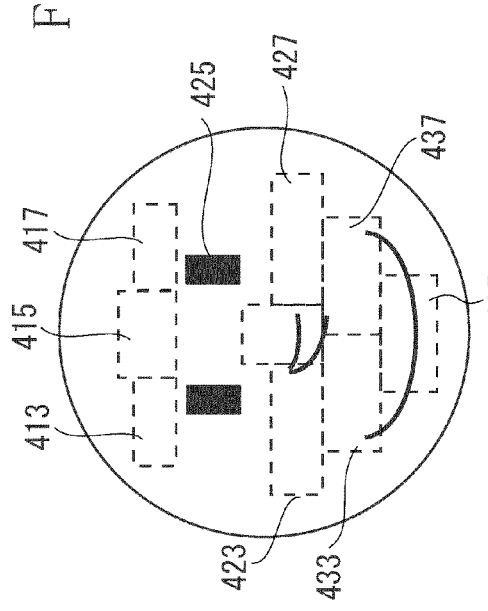
FIG. 8A illustrates a human face without a tilt.
Figure 8C:
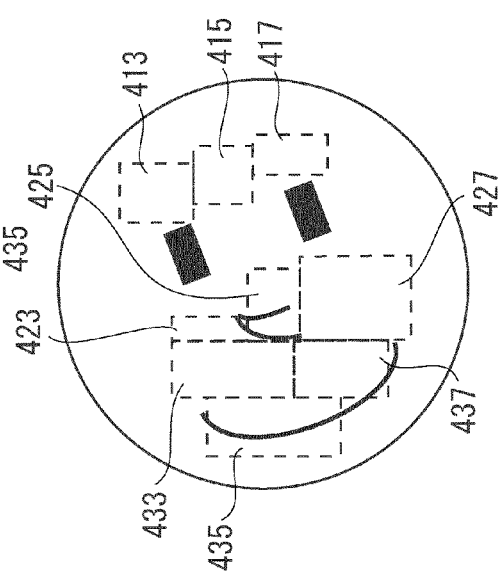
FIG. 8C illustrates a human face at a more tilt.

FIG. 8A illustrates a human face without a tilt, FIG. 8B illustrates a human face at a tilt, FIG. 8C illustrates a human face at a more tilt, and FIG. 8D illustrates a human face at a 90-degree tilt. In any of these cases illustrated in FIGS. 8A to 8D, the nine histogram acquisition regions 413, 415, 417, 423, 425, 427, 433, 435, and 437 can be set and the forehead, nose, cheeks, and mouth of the human face can be recognized.

To accommodate a change in an angle of the human face, the image processing circuit 3 can change positions and shapes of the histogram acquisition regions accordingly. Alternatively, the image processing circuit 3 can rotate the image itself so that the face tilt angle is always at approximately 0 degree. If the image processing circuit 3 can convert the image so that the face is always in a normal position by rotating the image, the image processing circuit 3 does not need to change the histogram acquisition regions according to change in the angle of the human face. In addition, each of the histogram acquisition regions may have a diamond shape or a curved shape, for example.

Figure 9:
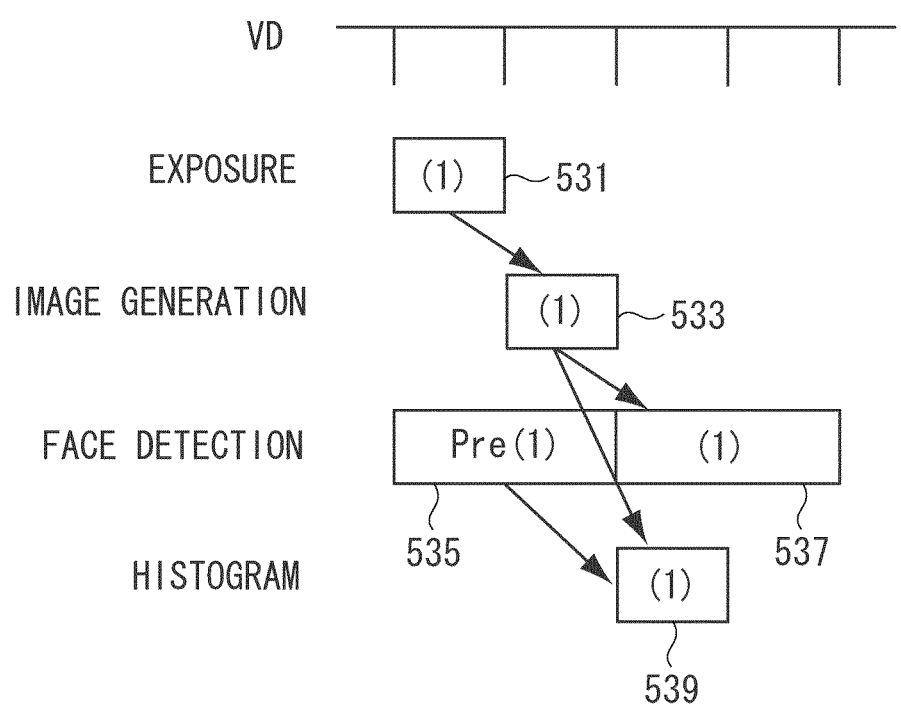
FIG. 9 illustrates timing control that causes an erroneous determination.

Upon acquiring the luminance histogram, the image processing circuit 3 analyzes the luminance histogram and detects a face contrast. As described above, accessories attached to the face, facial characteristics, and the like (see FIGS. 3 and 4) may cause an erroneous determination in the detection of the face contrast. In addition, timing control in the detection of the face contrast may also cause an erroneous determination. Next, timing control that causes an erroneous determination will be described. FIG. 9 illustrates timing control that causes an erroneous determination.

When the TG 5 receives a control signal from the control circuit 1, the TG 5 outputs a vertical synchronizing signal VD as a driving signal to the image sensor 4 in a certain period. In process 531, the image sensor 4 performs exposure of an object based on the vertical synchronizing signal VD or the like. Exposure data becomes readable in a next period of the vertical synchronizing signal VD, and thus, in process 533, the image processing circuit 3 reads the exposure data and generates an image, that is, executes a development process. In the next period of the vertical synchronizing signal VD, namely in process 537, the face detection block of the image recognition circuit 2 executes a face detection process on the initial exposure data (image (1)).

The processing time of the face detection process may vary and exceed a single period of the vertical synchronizing signal VD. Thus, in process 539, if the image processing circuit 3 tries to acquire luminance histograms of the image (1) immediately after the image (1) is generated, there may be cases where in process 537 the face detection block has not completed the face detection using the image (1) at this point.

In such case, in process 539, the image processing circuit 3 does not acquire the luminance histograms of the image (1) but luminance histograms of an image Pre(1) which is acquired prior to the image (1). If movement of the object and the photographer is small, a resultant image is not adversely affected greatly. However, the greater the movement of the object and the photographer is, the greater the difference between the images (1) and Pre (1) will be. Consequently, the image processing circuit 3 erroneously determines contrast of the face more easily. Thus, to prevent such erroneous determination caused by data discrepancy in timing control, it is desirable that the image from which luminance histograms are acquired be the same as the image on which face detection is executed.

In the present exemplary embodiment, the camera 100 executes the following timing control. FIG. 10 illustrates timing control according to the present exemplary embodiment of the present invention.

As described above, in process 501, the image sensor 4 performs exposure of an object based on the vertical synchronizing signal VD or the like. Since the exposure data becomes readable in the next period of the vertical synchronizing signal VD, in process 503 the image processing circuit 3 reads the exposure data and generates an image. In the next period of the vertical synchronizing signal VD, namely in process 505, the face detection block of the image recognition circuit 2 executes a face detection process on the initial exposure data (image (1)).

Next, in process 507 the image processing circuit 3 acquires the luminance histograms after the face detection block completes the face detection, instead of immediately after the image processing circuit 3 generates the image (1). Thus, the image from which luminance histograms are acquired is the same as the image on which face detection is executed (the image (1) in this case). Next, upon acquiring the luminance histograms, in process 509, the image processing circuit 3 analyzes the luminance histograms and detects the face contrast. Face contrast detection will be described in detail below.

It is assumed that the face contrast detection does not need to be sensitive to change of the object and the environment, the image processing circuit 3 executes each of the analysis processes 509, 511, and 513 every eight periods of the vertical synchronizing signal VD, as illustrated in FIG. 10. The analysis timing can be arbitrarily changed in view of a frequency of the vertical synchronizing signal VD, a response rate required by a mounted product, and the like.

To reduce erroneous determination of the face contrast detection, the image processing circuit 3 may determine the face contrast when a plurality of periodically-obtained face detection results are consecutively identical. For example, the image processing circuit 3 may use 24 periods of the vertical synchronizing signal VD to acquire three identical analysis results in eight periods for each analysis process, and determines the face contrast.

Thus, by setting a plurality of histogram acquisition regions in a human face and executing appropriate timing control, the image processing circuit 3 can acquire histograms of the forehead, nose-cheek, nose-cheek-mouth, and entire face regions of a human face.

FIGS. 11A to 11D illustrate examples of the luminance histograms of each of the regions. In each of the luminance histograms, a horizontal axis represents a luminance value (8 bit) and a vertical axis represents pixel numbers. The forehead region histogram in FIG. 11A is a luminance histogram acquired based on the forehead region 411 in FIG. 7A. The nose-cheek region histogram in FIG. 11B is a luminance histogram acquired based on the nose-cheek region 421 in FIG. 7A. The nose-cheek-mouth region histogram in FIG. 11C is a luminance histogram acquired based on the nose-cheek-mouth region 431 in FIG. 7B. The entire face region histogram in FIG. 11D is a luminance histogram acquired based on the histogram acquisition region 441 corresponding to the entire face in FIG. 6.

In the present exemplary embodiment, the image processing circuit 3 analyzes these luminance histograms to detect the face contrast.

The human face illustrated in FIG. 7A does not have forelocks or wear a cap which covers the forehead. Thus, in any of the luminance histograms acquired based on such face, a higher pixel distribution tends to be seen on the high luminance side. For example, if black forelocks fall over the forehead, the forehead region histogram in FIG. 11A may not show a high pixel distribution on the high luminance side. Further, if external light illuminates a face weakly, neither of the histograms in FIGS. 11A and B shows a high pixel distribution on the high luminance side. To determine a luminance distribution on the high luminance side, the image processing circuit 3 calculates a luminance value LiY which is a luminance value corresponding to a certain percentage of the total distribution pixels.

As illustrated in the forehead region histogram in FIG. 11A, the image processing circuit 3 calculates luminance values LiY(n) 617, 615, 613, and 611 which correspond to four certain percentages on the high luminance side, that is, 70%, 85%, 90%, and 95% of the total distribution pixels, respectively. More specifically, to calculate the luminance value LiY(4) 617, the image processing circuit 3 counts pixels from the low luminance side. When the pixel number reaches 70% of the total distribution pixels, the image processing circuit 3 determines the luminance value corresponding to the pixel number as the luminance value LiY(4) 617.

Similarly, to calculate the luminance value LiY(3) 615, the image processing circuit 3 counts pixels from the low luminance side. When the pixel number reaches 85% of the total distribution pixels, the image processing circuit 3 determines the luminance value corresponding to the pixel number as the luminance value LiY(3) 615. Similarly, to calculate the luminance value LiY(2) 613, the image processing circuit 3 counts pixels from the low luminance side. When the pixel number reaches 90% of the total distribution pixels, the image processing circuit 3 determines the luminance value corresponding to the pixel number as the luminance value LiY(2) 613. Similarly, to calculate the luminance value LiY(1) 611, the image processing circuit 3 counts pixels from the low luminance side. When the pixel number reaches 95% of the total distribution pixels, the image processing circuit 3 determines the luminance value corresponding to the pixel number as the luminance value LiY(1) 611.

Similarly, as illustrated in the nose-cheek region histogram in FIG. 11B, the image processing circuit 3 calculates luminance values LiY(n) 627, 625, 623, and 621 which correspond to four certain percentages on the high luminance side, that is, 70%, 85%, 90%, and 95% of the total distribution pixels, respectively. The luminance values LiY(4) 627, LiY(3) 625, LiY(2) 623, and LiY(1) 621 correspond to 70%, 85%, 90%, and 95% of the total distribution pixels, respectively.

If forelocks fall over and cover the forehead as illustrated in FIG. 3A, the forehead has a low luminance value LiY. Thus, for example, the image processing circuit 3 compares a luminance value LiY(n) calculated based on the forehead region with a luminance value LiY(n) calculated based on the nose-cheek region and uses the higher luminance value LiY(n) as a high luminance value of the human face. Alternatively, the image processing circuit 3 may compare an average value of the luminance values LiY(1) to LiY(4) calculated based on the forehead region with an average value of the luminance values LiY(1) to LiY(4) calculated based on the nose-cheek region and use the higher luminance values LiY(1) to LiY(4) as high luminance values of the human face.

While the nose-cheek-mouth region histogram in FIG. 11C includes a high distribution on the low luminance side, the histogram also includes a somewhat high luminance distribution on the high luminance side. Such high distribution on the low luminance side is attributable to shadows of the nose bridge and the cheeks. The distribution on the high luminance side is attributable to the histogram acquisition regions 423, 425, and 427 included in the cheek region.

The histogram acquisition regions 423, 425, and 427 included in the cheek region are used because a situation where the face detection block cannot detect the tips of the raised portions of the cheeks is assumed. Since the nose-cheek-mouth region histogram is used to detect low luminance shadows included in the human face, even if a somewhat high distribution is seen on the high luminance side, the image processing circuit 3 can detect low luminance shadows without problems. In addition, in the present exemplary embodiment, the image processing circuit 3 uses the nose-cheek-mouth region histogram to calculate a luminance value ShY on the low luminance side, which is a luminance value corresponding to a certain percentage of the total distribution pixels.

For example, the image processing circuit 3 calculates luminance values ShY(n) 631, 633, 635, and 637 which correspond to four certain percentages on the low luminance side, that is, 5%, 10%, 15%, and 30% of the total distribution pixels, respectively. More specifically, to calculate the luminance value ShY(1) 631, the image processing circuit 3 counts pixels from the low luminance side. When the pixel number reaches 5% of the total distribution pixels, the image processing circuit 3 determines the luminance value corresponding to the pixel number as the luminance value ShY(1) 631. Similarly, to calculate the luminance value ShY(2) 633, the image processing circuit 3 counts pixels from the low luminance side. When the pixel number reaches 10% of the total distribution pixels, the image processing circuit 3 determines the luminance value corresponding to the pixel number as the luminance value ShY(2) 633. Similarly, to calculate the luminance value ShY(3) 635, the image processing circuit 3 counts pixels from the low luminance side. When the pixel number reaches 15% of the total distribution pixels, the image processing circuit 3 determines the luminance value corresponding to the pixel number as the luminance value ShY(3) 635. Similarly, to calculate the luminance value ShY(4) 637, the image processing circuit 3 counts pixels from the low luminance side. When the pixel number reaches 30% of the total distribution pixels, the image processing circuit 3 determines the luminance value corresponding to the pixel number as the luminance value ShY(4) 637.

The entire face region histogram in FIG. 11D reflects luminance values of main facial parts such as the forehead, eyes, cheeks, nose, and mouth. The image processing circuit 3 uses the entire face region histogram to calculate an average face luminance FaY. For example, the image processing circuit 3 calculates an average face luminance value FaY 641 corresponding to 50% of the total distribution pixels.

In this way, the image processing circuit 3 analyzes the luminance histograms to calculate luminance values corresponding to certain percentages of the total distribution pixels, that is, the high luminance values LiY(n), the low luminance values ShY(n), and the average face luminance value FaY. Then, the image processing circuit 3 uses, for example, a Gamma table illustrated in FIG. 12 and executes deGamma processing.

Figure 12:
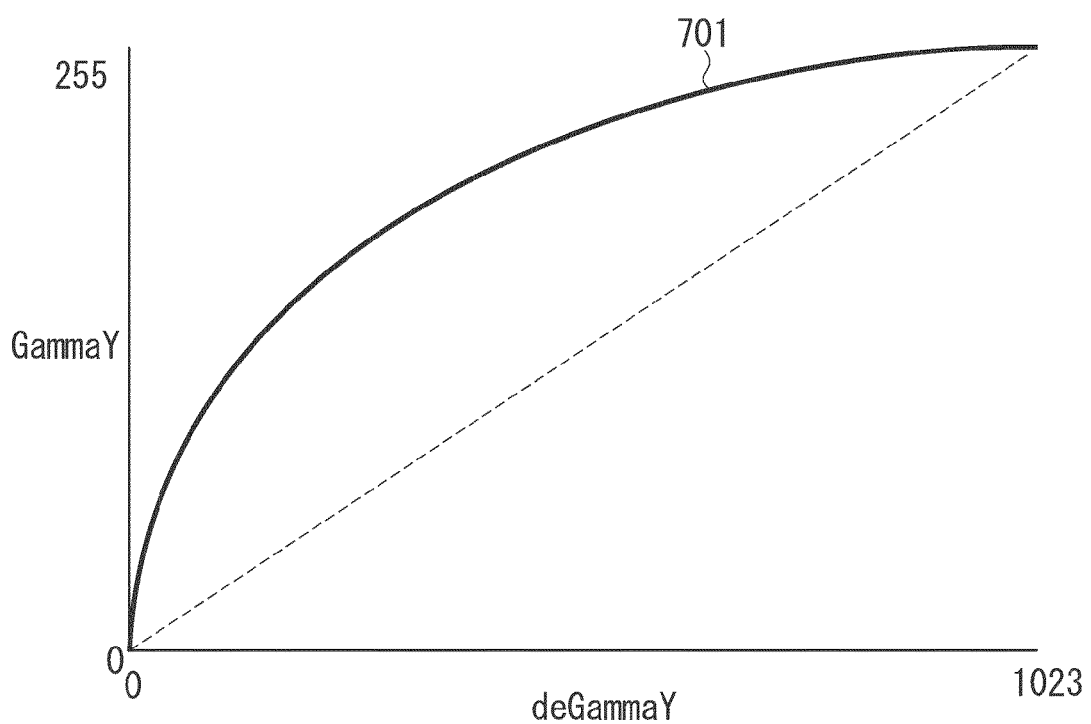
FIG. 12 illustrates an example of a Gamma table.

In the present exemplary embodiment, when the development process for image generation is executed, the image processing circuit 3 uses the Gamma table in FIG. 12 and executes Gamma processing which means that the luminance values acquired from the luminance histograms have been subjected to Gamma processing. Thus, as preprocessing to facilitate determination of the face contrast, which will be executed later, the image processing circuit 3 executes deGamma processing to obtain Y values having linear characteristics. In FIG. 12, Y values before deGamma processing (GammaY) are plotted based on an 8-bit range, and Y values after deGamma processing (deGammaY) are plotted based on a 10-bit range. If the image processing circuit 3 does not execute Gamma processing when executing the development process, the deGamma processing is not necessary.

Then, the image processing circuit 3 calculates a difference value between each of the high luminance values LiY(n) after deGamma processing and its respective AE target luminance level that indicates deviation from the AE target luminance level. In addition, the image processing circuit 3 calculates a difference value between each of the low luminance values ShY(n) after deGamma processing and its respective AE target luminance level that indicates deviation from the AE target luminance level. For example, as a luminance amount calculation unit, the image processing circuit 3 uses the following expressions 1 and 2 to calculate a high luminance amount ΔLi(n) and a low luminance amount ΔSh(n) as the difference values. Reference luminance levels ReY included in the expressions 1 and 2 are expressed in the 10-bit range used in the deGamma processing and arbitrarily set as a target luminance levels of the human face.

$$\Delta Li(n) = \log_2(LiY(n)/ReY) \quad \text{(expression 1)}$$

$$\Delta Sh(n) = \log_2(ShY(n)/ReY) \quad \text{(expression 2)}$$

In addition, the image processing circuit 3 calculates a difference value between the high luminance value LiY(n) and the low luminance value ShY(n). For example, the image processing circuit 3 uses the following expression 3 to calculate a luminance amount difference ΔLiSh(n) as the difference value.

$$\Delta LiSh(n) = \log_2(LiY(n)/ShY(n)) \quad \text{(expression 3)}$$

Next, the image processing circuit 3 uses these high luminance amounts ΔLi(n), low luminance amounts ΔSh(n), and luminance amount differences ΔLiSh(n) to determine whether the face includes a contrast. More specifically, as described below, first, the image processing circuit 3 determines whether each of a plurality of kinds of high luminance amounts ΔLi(n) exceeds a certain value. In this way, the image processing circuit 3 can determine whether external light strongly illuminates the forehead, nose, and cheeks of the human face.

$$\Delta Li(1) > ChLiLv1$$

$$\Delta Li(2) > ChLiLv2$$

$$\Delta Li(3) > ChLiLv3$$

$$\Delta Li(4) > ChLiLv4$$

ChLiLv1 is a highest value, and values decrease in order of ChLiLv2, ChLiLv3, and ChLiLv4. In the present exemplary embodiment, the image processing circuit 3 determines whether each of the high luminance amounts ΔLi(1) to ΔLi(4) satisfies its respective expression above. However, alternatively, the image processing circuit 3 may simply determine whether some of the high luminance amounts ΔLi(1) to ΔLi(4) satisfy its respective expression above.

In addition, as described below, the image processing circuit 3 determines whether each of a plurality of kinds of low luminance amounts ΔSh(n) falls below a certain value. In this way, the image processing circuit 3 can determine whether the human face includes shadows around the lower cheeks and the mouth.

$$\Delta Sh(1) < ChShLv1$$

$$\Delta Sh(2) < ChShLv2$$

$$\Delta Sh(3) < ChShLv3$$

$$\Delta Sh(4) < ChShLv4$$

ChShLv1 is a lowest value, and the values increase in order of ChShLv2, ChShLv3, and ChShLv4. In the present exemplary embodiment, the image processing circuit 3 determines whether each of the low luminance amounts ΔSh(1) to ΔSh(4) satisfies its respective expression above. However, alternatively, the image processing circuit 3 may simply determine whether some of the low luminance amounts ΔSh(1) to ΔSh(4) satisfy its respective expression above.

In addition, as described below, the image processing circuit 3 determines whether each of a plurality of kinds of luminance amount differences ΔLiSh(n) exceeds a certain value. In this way, the image processing circuit 3 can determine whether the human face includes a strong contrast.

$$\Delta LiSh(1) > ChLiShLv1$$

$$\Delta LiSh(2) > ChLiShLv2$$

$$\Delta LiSh(3) > ChLiShLv3$$

$$\Delta LiSh(4) > ChLiShLv4$$

The luminance amount difference ΔLiSh(1) is acquired from a ratio between a value of the highest luminance amount ΔLi(1) and a value of the lowest luminance amount ΔSh(1). A difference between the value of the highest luminance amount ΔLi(1) and the value of the lowest luminance amount ΔSh(1) is the greatest, when compared with the difference between a value of any other high luminance amount ΔLi(n) and a value of any other low luminance amount ΔSh(n). From the luminance amount differences ΔLiSh(2) to ΔLiSh(4) in this order, the difference between a value of the high luminance amount ΔLi(n) and a value of the low luminance amount ΔSh(n) becomes smaller, and the values of ChLiShLv1 to ChLiShLv4 are accordingly decreased. In the present exemplary embodiment, the image processing circuit 3 determines whether each of the luminance amount differences ΔLiSh(1) to ΔLiSh(4) satisfies its respective expression above. However, alternatively, the image processing circuit 3 may simply determine whether some of the luminance amount differences ΔLiSh(1) to ΔLiSh(4) satisfy its respective expression above.

Based on the processes described above, the image processing circuit 3 can determine presence or absence of the face contrast. However, there are cases where these processes alone cannot accurately determine whether the face contrast is naturally formed by external light. For example, as illustrated in FIG. 3B, since the mustache 353 causes a low luminance level as a shadow does, the image processing circuit 3 may not be able to execute accurate determination of the face contrast.

Figure 13:
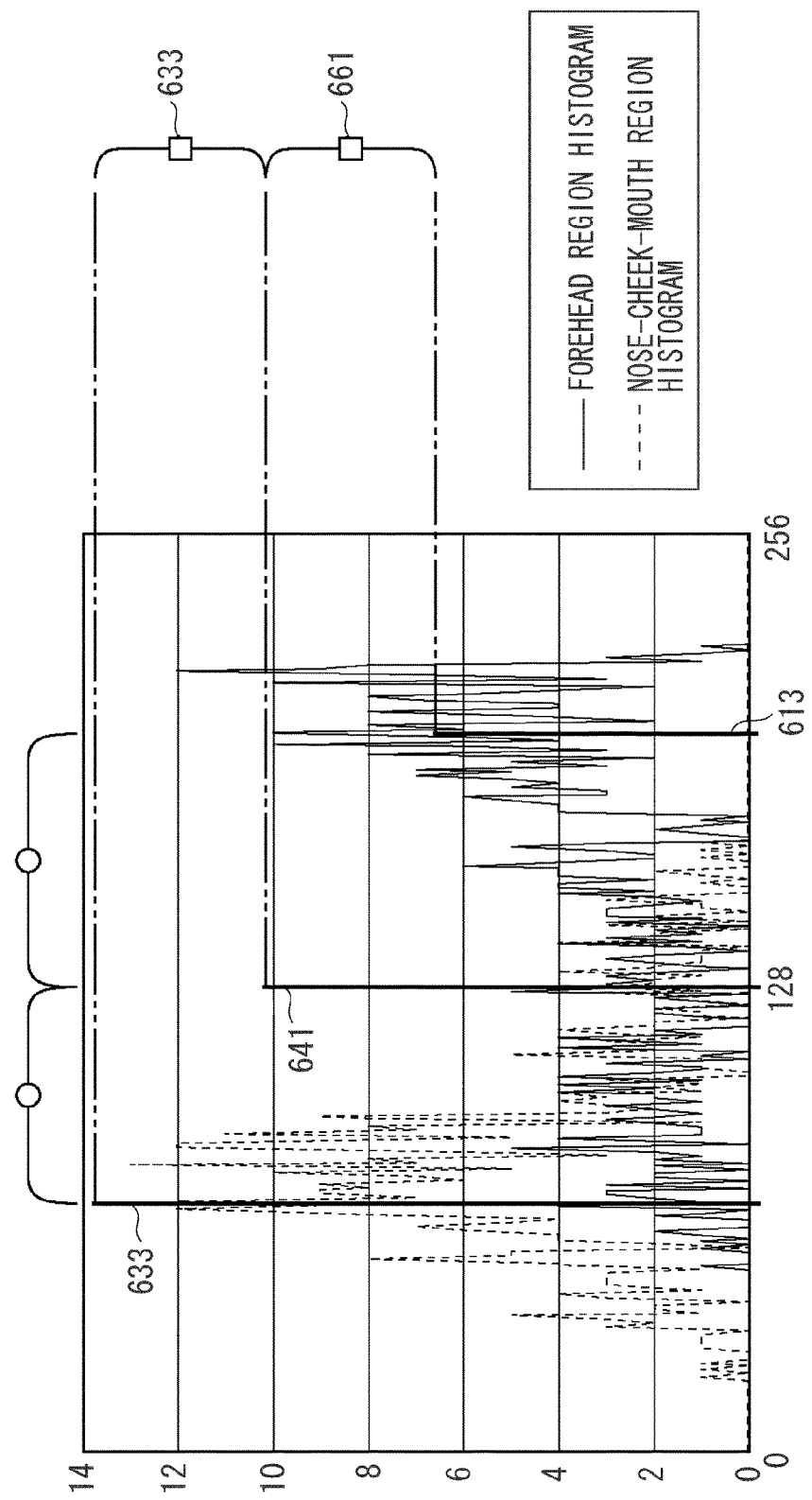
FIG. 13 illustrates a histogram in which two different histograms are superposed on each other.

In the present exemplary embodiment, the image processing circuit 3 determines whether there is a symmetry in luminance level difference between the high luminance amount ΔLi(n) and the low luminance amount ΔSh(n). FIG. 13 is a histogram in which the forehead region histogram in FIG. 11A and the nose-cheek-mouth region histogram in FIG. 11C are superposed on the same axes. As described above, in the forehead region histogram, a high distribution is seen on the high luminance side, and in the nose-cheek-mouth region histogram, a high distribution is seen on the low luminance side. The histogram in FIG. 13 also includes the high luminance value LiY(2) 613 in FIG. 11A, the low luminance value ShY(2) 633 in FIG. 11C, and the average face luminance value FaY 641 in FIG. 11D.

Further in the example in FIG. 13, if the average face luminance value FaY 641 is used as a reference, an absolute value of a high luminance amount ΔLi 661 and an absolute value of a low luminance amount ΔSh 663 are approximately equal to each other. In other words, a certain level of symmetry exists between the high luminance amount ΔLi 661 and the low luminance amount ΔSh 663. A face contrast naturally formed by external light exhibits such characteristics. On the other hand, a face contrast formed by the mustache 353 in FIG. 3B does not exhibit such characteristics. When a low luminance amount calculated based on the local black mustache 353 is compared with a high luminance amount calculated based on normal light, the absolute value of the low luminance amount ΔSh is significantly higher than that of the high luminance amount ΔLi. Namely, no symmetry can be found.

Based on such characteristics, in the present exemplary embodiment, the image processing circuit 3 calculates a luminance level difference ΔFa between an average face luminance and a target face luminance. By using the luminance level difference ΔFa as a reference, the image processing circuit 3 calculates a difference ΔSy(n) between a high luminance amount and a low luminance amount. For example, the image processing circuit 3 calculates the luminance level difference ΔFa based on expression 4 and the luminance amount difference ΔSy(n) based on expression 5.

$$\Delta Fa = \log_2(FaY/ReY) \quad \text{(expression 4)}$$

$$\Delta Sy(n) = \Delta Li(n) + \Delta Sh(n) - \Delta Fa \quad \text{(expression 5)}$$

As described below, as a determination unit, the image processing circuit 3 determines whether each of the calculated luminance amount differences ΔSy(n) falls within a certain range. In this way, the image processing circuit 3 can determine whether a symmetry exists between a high luminance amount and a low luminance amount. The image processing circuit 3 uses logarithmic addition to calculate the luminance amount differences ΔSy(n). Thus, in practice, the image processing circuit 3 determines whether a ratio between the high luminance amount and the low luminance amount falls within a certain range using the average face luminance as a reference.

$$ChSy1\text{Low} < \Delta Sy(1) < ChSy1\text{Hi}$$

$$ChSy2\text{Low} < \Delta Sy(2) < ChSy2\text{Hi}$$

$$ChSy3\text{Low} < \Delta Sy(3) < ChSy3\text{Hi}$$

$$ChSy4\text{Low} < \Delta Sy(4) < ChSy4\text{Hi}$$

The luminance amount difference ΔSy(1) is used for the highest luminance amount ΔLi(1) and the lowest luminance amount ΔSh(1). The difference between a value of the highest luminance amount ΔLi(1) and a value of the lowest luminance amount ΔSh(1) is the greatest, when compared with the difference between a value of any other high luminance amount ΔLi(n) and a value of any other low luminance amount ΔSh(n). From the luminance amount differences ΔSy(2) to ΔSy(4) in this order, the difference between a value of the high luminance amount ΔLi(n) and a value of the low luminance amount ΔSh(n) becomes smaller. In the present exemplary embodiment, the image processing circuit 3 determines whether each of the luminance amount differences ΔSy(1) to ΔSy(4) satisfies its respective expression above. However, alternatively, the image processing circuit 3 may simply determine whether some of the luminance amount differences ΔSy(1) to ΔSy(4) satisfy its respective expression above.

The above determination method is based on the premise that the average face luminance value FaY has been calculated as an accurate reference. However, in practice, dark eyes, dark eye brows, and the like affect the average face luminance value FaY. Thus, there are cases where use of the average face luminance value FaY as the reference is not preferable. In such case, it is preferable that the image processing circuit 3 determines whether a difference between two of the luminance amount differences ΔSy(n) falls within a certain range, as below.

$$ChSy12\text{Low} < (\Delta Sy(1) - \Delta Sy(2)) < ChSy12\text{Hi}$$

$$ChSy23\text{Low} < (\Delta Sy(2) - \Delta Sy(3)) < ChSy23\text{Hi}$$

$$ChSy34\text{Low} < (\Delta Sy(3) - \Delta Sy(4)) < ChSy34\text{Hi}$$

$$ChSy41\text{Low} < (\Delta Sy(4) - \Delta Sy(1)) < ChSy41\text{Hi}$$

In this way, variations of the luminance level difference ΔFa used as the reference can be reduced. When there is a disturbance in symmetry, the image processing circuit 3 determines that a value is outside the certain range of any of the above conditions.

When calculating the high and low luminance amounts ΔLi(n) and ΔSh(n), the image processing circuit 3 may use the average face luminance value FaY as a reference luminance level, instead of the reference luminance level ReY as the target luminance level of the human face. In this case, the luminance level difference ΔFa is unnecessary to calculate the luminance amount differences ΔSy(n).

In addition, in the present exemplary embodiment, the image processing circuit 3 uses logarithm to determine whether each difference ΔSy(n) between the high luminance amount ΔLiY(n) and the low luminance amount ΔShY(n) falls within a certain range. However, the method for evaluating such symmetry is not limited to this method. For example, the image processing circuit 3 may calculate a difference between the average face luminance value FaY and the high luminance value LiY(n), a difference between the average face luminance value FaY and the low luminance value ShY(n), and a ratio between these differences. In this way, by determining whether this ratio falls within a certain range, the image processing circuit 3 can determine whether a symmetry exists between the high luminance value LiY(n) and the low luminance value ShY(n).

Figure 14:
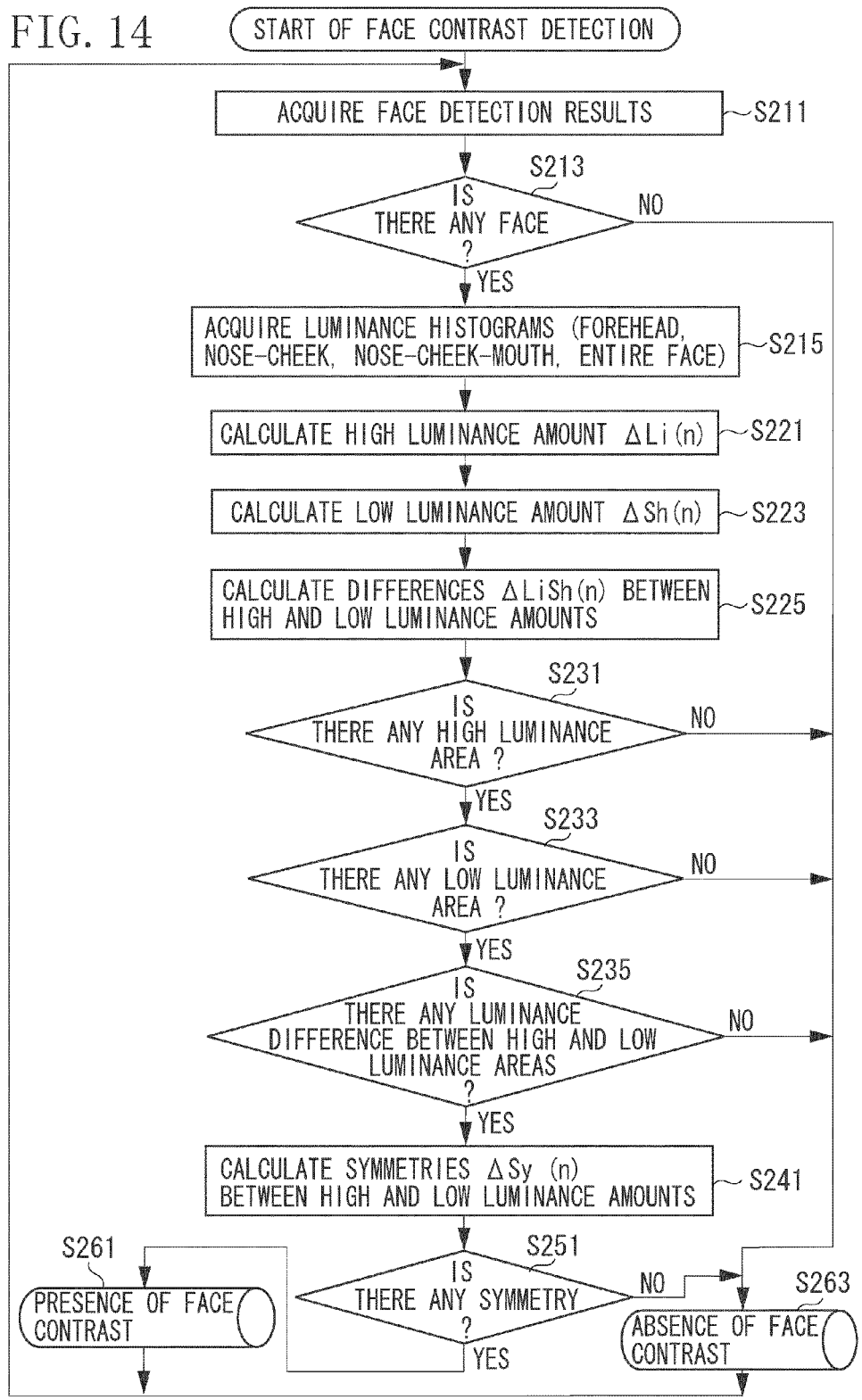
FIG. 14 is a flow chart illustrating a face contrast detection process.

FIG. 14 illustrates a process for such face contrast detection. FIG. 14 is a flow chart illustrating a face contrast detection process executed by the image processing circuit 3.

In step S211, the image processing circuit 3 acquires face detection results from an image which is generated from the exposure of an object. Next, in step S213, the image processing circuit 3 determines whether the image includes a face. If the image includes a face (YES in step S213), the processing proceeds to step S215. In step S215, the image processing circuit 3 acquires histograms using the face detection results from the image which is generated from the same exposure of the object. If the image does not include a face (No in step S213), then in step S263 the image processing circuit 3 determines that no face contrast exists.

After acquiring the luminance histograms, by using each of the luminance histograms, in step S221 the image processing circuit 3 calculates the high luminance amounts ΔLi(n), in step S223 the image processing circuit 3 calculates the low luminance amounts ΔSh(n), and in step S225 the image processing circuit 3 calculates the luminance amount differences ΔLiSh(n) at least one point of the luminance histograms. These processes include acquisition of the above described high luminance value LiY(n), low luminance value ShY(n), and average face luminance value FaY and the deGamma processing.

Next, in step S231, the image processing circuit 3 determines whether the high luminance amount ΔLi(n) is above or below a certain value. In step S233, the image processing circuit 3 determines whether the low luminance amount ΔSh(n) is above or below a certain value. In step S235, the image processing circuit 3 determines whether the luminance amount difference ΔLiSh(n) is above or below a certain value. In other words, the image processing circuit 3 determines whether the human face to be processed includes a contrast.

If the image processing circuit 3 determines that any of the high luminance conditions, the low luminance conditions, the high-low luminance difference conditions is not satisfied (NO in step S231, S233, or S235), the processing proceeds to step S263. In step S263 the image processing circuit 3 determines that no face contrast exists. More specifically, if the image processing circuit 3 does not detect the high or low luminance region and a certain luminance difference between the regions, then in step S263, the image processing circuit 3 determines that the image does not include the face contrast.

On the other hand, if the image processing circuit 3 detects both the high and low luminance regions and the certain luminance difference between the regions (YES in step S235), in step S241, the image processing circuit 3 calculates the luminance amount differences ΔSy(n).

Next, in step S251, by using the luminance amount differences ΔSy(n), the image processing circuit 3 determines presence or absence of a symmetry between the high and low luminance amounts. If the image processing circuit 3 does not determine that there is a certain symmetry (NO in step S251), in step S263, the image processing circuit 3 determines that the image does not include the face contrast. This corresponds to a situation where a contrast exists because of facial characteristics such as a mustache or accessories such as sunglasses, for example. On the other hand, if the image processing circuit 3 determines that there is a certain symmetry (YES in step S251), in step S261 the image processing circuit 3 determines that the image includes the face contrast. In this way, the image processing circuit 3 executes the face contrast detection process.

For example, the camera 100 including the image recognition circuit 2, the image processing circuit 3, and the like operate as follows. FIG. 15 is a flow chart illustrating an operation of the camera 100.

When the camera 100 is activated, in step S101, the control circuit 1 starts a system including a power supply, a central processing unit (CPU), a memory, and the like. Next, in step S103, the control circuit 1 starts devices such as a zoom motor, a focus motor, a aperture, and a shutter, to move a lens included in the camera 100 to a photographing position.

In step S105, the control circuit 1 starts automatic exposure (AE) control, automatic focus (AF) control, and automatic white balance (AWB) control, to display an image of the object with an appropriate brightness, focus, and color tone on a display screen such as a liquid crystal display (LCD).

After completion of necessary preparations including the above control processes for displaying the image of the object, in step S107, the control circuit 1 starts to output a live image to the display unit. A photographer can thus perform framing of the object while viewing the live image displayed on the display unit.

In steps S113, S115, and S117, the control circuit 1 periodically continues the above AE, AF, and AWB control processes, respectively, while displaying the live image. In this way, even if changes are caused in operations of the photographer or movement of the object, the control circuit 1 can maintain the brightness, focus, and color tone of the object image in an appropriate state.

Simultaneously, the control circuit 1 causes the image recognition circuit 2 and the image processing circuit 3 to execute the above face contrast detection process and the like. More specifically, in step S111, the control circuit 1 continuously determines whether the object image includes a certain face contrast. In the present exemplary embodiment, the control circuit 1 periodically executes detection of the face contrast. Thus, the display unit can constantly display face contrast detection results, and the image processing circuit 3 can determine whether a plurality of face contrast detection results obtained periodically are identical to each other.

In step S121, the control circuit 1 continuously monitors whether the photographer has pressed a switch SW1 that instructs the camera 100 to start preliminary processes. If the photographer presses the switch SW1 (YES in step S121), the control circuit 1 starts various preliminary processes for capturing an image. First, in step S123, the control circuit 1 executes the AE process to set an appropriate level of the aperture, shutter, and sensitivity used for capturing the image, depending on brightness of the object. Next, in step S125, the control circuit 1 executes the AF process to focus the camera 100 on the object. In addition to the focus adjustment, in step S125, the control circuit 1 calculates a distance between the camera 100 and the object, for example.

Then, in step S127, the control circuit 1 determines whether to fire a flash. In the present exemplary embodiment, the control circuit 1 refers to the results in step S111 (step S261 or S263) to determine whether to fire a flash. If the face contrast is present in the image and if the distance between the camera 100 and the object, the shutter speed, the luminance difference between the main object and the background, and the like satisfy certain conditions, the control circuit 1 determines that the camera 100 needs to fire a flash. The control circuit 1 may determine the need for flash firing based on other conditions.

Next, in step S131, the control circuit 1 continuously monitors whether the photographer has pressed a switch SW2 that instructs capturing of the image. If the photographer presses the switch SW2 (YES in step S131), the control circuit 1 refers to the determination results in step S127 and the processing proceeds to step S135. If a flash firing is necessary (YES in step 135), then in step S137, the control circuit 1 determines a flash firing amount required to capture the image. More specifically, as light adjustment processing, the control circuit 1 calculates reflectivity and a size of an object based on brightness of the object illuminated by external light alone and brightness of the object illuminated by preliminary flash firing with a certain flash firing amount, to calculate the flash firing amount required to actually capture an image.

Next, in step S141, the control circuit 1 controls the shutter and the like to actually capture an image. Consequently, the control circuit 1 performs exposure to the image sensor 4 to an appropriate amount of exposure and executes a development process to obtain an image with appropriate brightness, focus, and color. In the development process, low luminance regions in the image can be corrected brighter. For example, even if in step S111 the control circuit 1 detects the face contrast, if the distance between the camera 100 and the object is small, in step S127 the control circuit 1 may determine that no flash firing is necessary. In this case, since the camera 100 captures an image of a face with a high contrast, the control circuit 1 may correct the face contrast in the development process.

In the above example, the control circuit 1 executes the face contrast detection process in step S111. However, the control circuit 1 may execute the face contrast detection process only once after the photographer presses the switch SW1. The face contrast may be detected at an arbitrary timing according to required detection accuracy and mounted functions.

According to the present exemplary embodiment, the camera 100 can detect a face contrast naturally formed by external light while preventing erroneous determination attributable to various characteristics of and accessories attached to a human face. Thus, since the camera 100 can determine desirable photographing conditions based on the detection results, the photographer can obtain an appropriate image.

The exemplary embodiment according to the present invention has been described based on a camera that fires a flash to correct a face contrast. However, the present invention is also applicable to a camera that executes image processing to increase luminance values of low luminance level regions, instead of flash firing. If such image processing is executed on a read image, the present invention can also be applied to an image processing apparatus such as a personal computer, in addition to a camera.

Each of the steps of the exemplary embodiment according to the present invention can be realized by causing a processing unit (CPU, processor, or the like) such as a personal computer to execute software (a program) acquired via a network or any of the various types of storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-285649 filed Dec. 16, 2009, which is hereby incorporated by reference herein in its entirety.

What is claimed is:

1. An image processing apparatus comprising:
   a region detection unit configured to detect predetermined first region and second region in a human face as a target to be photographed;
   a luminance amount calculation unit configured to calculate a value of a difference between a luminance level of the first region and a certain reference luminance level as a first luminance amount and calculate a value of a difference between a luminance level of the second region and the reference luminance level as a second luminance amount; and
   a determination unit configured to determine whether a difference or a ratio between the first luminance amount and the second luminance amount falls within a certain range.

2. The image processing apparatus according to claim 1, further comprising:
   a control unit configured to determine whether to fire a flash in a case that the human face is photographed, based on a result of the determination by the determination unit.

3. The image processing apparatus according to claim 1, further comprising:
   a control unit configured to determine whether to execute an image correction process to brighten the second region if a development process is executed on an image obtained by photographing the human face, based on a result of the determination by the determination unit.

4. The image processing apparatus according to claim 1, wherein the region detection unit detects at least one of a forehead region located away from positions of eyes of the human face by a certain distance in a direction to top of the head, and a nose-cheek region located away from the positions of the eyes by a certain distance in a direction to a chin as the first region.

5. The image processing apparatus according to claim 4, wherein, if the first region is detected, the region detection unit excludes a region located within a certain area from the positions of the eyes and a mouth region located away from the positions of the eyes by a certain distance in a direction to the chin from the first region.

6. The image processing apparatus according to claim 1, wherein the region detection unit detects at least one of a cheek region located away from the positions of the eyes of the human face by a certain distance in a direction to the chin, and a mouth region located away from the positions of the eyes by a certain distance in a direction to the chin as the second region.

7. The image processing apparatus according to claim 6, wherein, if the second region is detected, the region detection unit excludes a region located within a certain area from the positions of the eyes and a forehead region located away from the positions of the eyes by a certain distance in a direction to top of the head from the second region.

8. The image processing apparatus according to claim 1, wherein the luminance amount calculation unit calculates absolute values of differences between each of a plurality of kinds of luminance levels of the first region and the certain reference luminance level as a plurality of kinds of the first luminance amounts and calculates absolute values of differences between each of a plurality of kinds of luminance levels of the second region and the certain reference luminance level as a plurality of kinds of the second luminance amounts, and
   wherein the determination unit calculates a plurality of kinds of differences by combining the plurality of kinds of the first luminance amounts and the plurality of kinds of the second luminance amounts, and determines whether at least one of the plurality of kinds of differences falls within the certain range.

9. The image processing apparatus according to claim 1, wherein the region detection unit uses a certain direction as a reference, and changes a shape of the first region and the second region according to a tilt angle of the human face with respect to the reference.

10. A method for processing an image, the method comprising:
    detecting predetermined first region and second region in a human face as a target to be photographed;
    calculating a value of a difference between a luminance level of the first region and a certain reference luminance level as a first luminance amount and calculating a value of a difference between a luminance level of the second region and the reference luminance level as a second luminance amount; and
    determining whether a difference or a ratio between the first luminance amount and the second luminance amount falls within a certain range.

11. A non-transitory computer-readable nonvolatile storage medium storing a program causing a computer to execute image processing, the image processing comprising:

detecting predetermined first region and second region in a human face as a target to be photographed;

calculating a value of a difference between a luminance level of the first region and a certain reference luminance level as a first luminance amount and calculating a value of a difference between a luminance level of the second region and the reference luminance level as a second luminance amount; and determining whether a difference or a ratio between the first luminance amount and the second luminance amount falls within a certain range.

12. The image processing apparatus according to claim 1, wherein the luminance amount calculation unit calculates an absolute value of difference between the luminance level of the first region and the certain reference luminance level as the first luminance amounts and calculates an absolute value of difference between the luminance level of the second region and the certain reference luminance level as the second luminance amounts.

* * * * *